US006992282B2

(12) United States Patent
Jacksier et al.

(10) Patent No.: US 6,992,282 B2
(45) Date of Patent: Jan. 31, 2006

(54) USE OF A NEBULIZER TO ADD GAS TO ELIMINATE METAL DEPOSITION ON THE SAMPLING ORIFICES OF AN INDUCTIVELY COUPLED PLASMA MASS SPECTROMETER

(75) Inventors: Tracey Jacksier, Lisle, IL (US); Janet Graehling, Downers Grove, IL (US); Farouk Kimour, Oak Park, IL (US)

(73) Assignee: American Air Liquide, Inc., Fremont, CA (US)

( * ) Notice: Subject to any disclaimer, the term of this patent is extended or adjusted under 35 U.S.C. 154(b) by 310 days.

(21) Appl. No.: 10/242,954

(22) Filed: Sep. 13, 2002

(65) Prior Publication Data

US 2003/0082826 A1 May 1, 2003

Related U.S. Application Data

(60) Provisional application No. 60/337,432, filed on Oct. 26, 2001.

(51) Int. Cl.

| | |
|---|---|
| ***B05D 5/03*** | (2006.01) |
| ***H01J 49/26*** | (2006.01) |
| ***B01D 59/44*** | (2006.01) |

(52) U.S. Cl. ....................... 250/282; 250/281; 250/288; 436/181; 359/333

(58) Field of Classification Search ................. 250/281, 250/282, 287, 288, 283, 284, 423 R, 423, 250/424; 134/1.1, 22.1; 359/333; 436/181
See application file for complete search history.

(56) References Cited

U.S. PATENT DOCUMENTS

| | | | | |
|---|---|---|---|---|
| 3,920,987 A | * | 11/1975 | Anbar et al. | 250/282 |
| 4,551,624 A | * | 11/1985 | Spangler et al. | 250/287 |
| 5,873,523 A | * | 2/1999 | Gomez et al. | 239/3 |
| 6,107,626 A | * | 8/2000 | Wang et al. | 250/288 |
| 6,544,484 B1 | * | 4/2003 | Kaufman et al. | 422/186.04 |
| 2001/0013579 A1 | * | 8/2001 | Andrien et al. | 250/423 R |

* cited by examiner

*Primary Examiner*—John H. Lee
*Assistant Examiner*—David A. Vanore
(74) *Attorney, Agent, or Firm*—Christopher J. Cronin

(57) ABSTRACT

Use of a nebulizer add-gas to reduce metal deposition on the sampling orifices of an inductively coupled plasma mass spectrometer ("ICP-MS") is disclosed. Specifically, dilute mixtures of Sulfur Hexafluoride ($SF_6$) in an inert gas have been used to reduce transition metal deposition on the sampling orifices of an ICP-MS, thereby greatly enhancing the stability of the ICP-MS sensitivity over time without corroding the internal parts and/or chemically attacking the cones of the ICP-MS.

7 Claims, 6 Drawing Sheets

A: 1000 ppm Hf + 10 ppb MES in 1% HF
B: 35% HCl
C: Peristaltic pump
D: Mixing coil

USE OF A NEBULIZER TO ADD GAS TO ELIMINATE METAL DEPOSITION ON THE SAMPLING ORIFICES OF AN INDUCTIVELY COUPLED PLASMA MASS SPECTROMETER

CROSS REFERENCE TO RELATED APPLICATION

This application claims the benefit of U.S. Provisional Application No. 60/337,432, filed Oct. 26, 2001.

BACKGROUND OF THE INVENTION

1. Field of the Invention

This invention relates to an improvement in the maintenance, operation and results obtained from the use of ICP-MS, particularly in the semiconductor industry. Use of a nebulizer add-gas to reduce metal deposition on the sampling orifices of an inductively coupled plasma mass spectrometer ("ICP-MS ") is disclosed. Specifically, dilute mixtures of Sulfur Hexafluoride ($SF_6$) in an inert gas have been used to reduce transition metal deposition on the sampling orifices of an ICP-MS, thereby greatly enhancing the stability of the ICP-MS sensitivity over time without corroding the internal parts and/or chemically attacking the cones of the ICP-MS.

2. Description of Prior Art

To manufacture semiconductor-grade chemicals, exceedingly accurate detection of impurities is required, lest the resulting component materials be impure and thereby unreliable.

According to Perkin-Elmer, its ELAN ICP-MS technology originated in 1983 at the University of Toronto with Dr. D. Douglas and Prof. J. B. French, working under contract to the Sciex Division of MDS Health Group. Sciex continued development and sales until 1986, when a joint venture was formed between Sciex and the Perkin-Elmer Corporation. Perkin-Elmer describes that Sciex develops and manufactures the ICP-MS at the Sciex facility in Toronto, and Perkin-Elmer provides a worldwide sales and service network.

A schematic of the ELAN 6000 is shown in FIG. 1. As shown in FIG. 1(*a*), the sample is introduced into the plasma for destruction of the sample matrix and ionization. Ions pass from the torch region, at atmospheric pressure, to the quadrupole mass spectrometer, at vacuum pressures, through the interface region consisting of skimmer and sampling cones. The ion lens focuses the ions into the spectrometer, which separates the ions by mass-to-charge ratio and directs them to the detector where they are measured.

Metal complexes, alkoxides, and halides of transition metals such as Zr (Zirconium), Hf (Hafnium), Ta (Tantalum), Si (Silicon), Ti (Titanium), Cu (Copper) and Sb (Antimony) are being investigated for use as either high or low conductivity materials for the semiconductor industry. As such, the purity of these high conductivity materials is quite important. Typically these materials are decomposed in acids, bases or organic solvents and are subsequently analyzed by inductively coupled plasma mass spectrometry (ICP-MS) in order to obtain the concentration of trace elemental impurities.

However, owing to the high matrix concentration of the transition metal, deposition on the sampling orifices ultimately occurs which severely alters the analytical sensitivity and achievable detection limits of impurities present in these compounds. The degradation of performance can occur in as little as 10 minutes. Although dilution of the decomposed material is a viable alternative to decreasing the deposition on the sampling orifices, the requisite detection limits cannot be obtained.

Efforts to control the long-term, steady state operability of ICP detection apparatus have been reported in the literature. For example, D. Demers and A. Montaser describe the change in transport of analyte to plasma with change in injector gas flow rate for a concentric pneumatic nebulizer in their text, Inductively Coupled Plasmas in Ananytical Atomic Spectrometry, 2d Edition, ch. 11, at pages 524–525 (VCH). Specifically, to promote combustion and thereby reduce the background and noise in the plasma tailflame, oxygen is added to the injector gas flow. The introduction of oxygen has thus been used to decrease carbon deposition on the cones. Oxide formation must be avoided, however, to eliminate interferences from the erroneous detection of oxides.

In the article R. Hutton, et al., "Investigations into the Direct Analysis of Semiconductor Grade Gases by Inductively Coupled Plasma Mass Spectrometry," Journal of Analytical Atomic Spectrometry, September 1990, v. 5 (pages 463–466), efforts to reduce matrix depositions on the sampler orifice of ICP-MS apparatus used to detect silane used to produce compounds of silicon are disclosed. Efforts described therein include the substitution of an alloy sample cone in place of the nickel cones then available, and supplementing the argon carrier gas with hydrogen gas. Thus, $H_2$ is added to decrease the formation of Si deposition.

T. Jacksier, et al., "Qualitative Analysis of Arsine by Sealed inductively Coupled Plasma Atomic Emission Spectrometry," Journal of Analytical Atomic Spectrometry, September 1992, v. 7 (pages 839–844) discloses the use of hydrogen, hydrogen chloride or chlorine as additive gases to promote arsenic vaporization. The reference describes reacting additive gases with the arsenic in an effort to form a volatile arsenic species that did not adsorb on the container walls. Additionally, $Cl_2$ was added to reduce As deposition within the equipment.

For the forgoing reasons, there has been defined a long felt and unsolved need for a method of analyzing metal complexes, alkoxides, and halides of transition metals such as Zr (Zirconium), Hf (Hafnium), Ta (Tantalum), Si (Silicon), Ti (Titanium), Cu (Copper), Sb (Antimony) and the like that does not result in the deposition on the sampling orifices that degrades the analyzing capability of the apparatus while at the same time preserving the ability of the apparatus to provide data within the requisite detection limits as specified by the purities demanded in the electronics industry.

SUMMARY OF THE INVENTION

This invention relates to an improvement in the maintenance, operation and results obtained from using ICP-MS, and particularly in the semiconductor industry. Use of a nebulizer add-gas to reduce metal deposition on the sampling orifices of an inductively coupled plasma mass spectrometer ("ICP-MS") is disclosed. Specifically, dilute mixtures of Sulfur Hexafluoride ($SF_6$) in an inert gas have been used to reduce transition metal deposition on the sampling orifices of an ICP-MS.

Thus, it is an object of the present invention to reduce the rate at which deposition occurs on the ICP-MS sampling orifices, thereby maintaining the ability of the ICP-MS to provide data sufficiently precise to facilitate production and use of high and low conductivity materials as required in the semiconductor industry.

These and other objects, advantages and features of the present invention will be apparent from the detailed description that follows.

BRIEF DESCRIPTION OF THE DRAWINGS

In the detailed description that follows, reference will be made to the following figures:

FIG. 1(*b*) is a schematic cross-sectional view of an ICP-MS torch illustrating the relative position of the different gas flows;

DETAILED DESCRIPTION OF A PREFERRED EMBODIMENT

This invention relates to an improvement in the maintenance, operation and results obtained from using ICP-MS, and particularly in the semiconductor industry. To manufacture semiconductor-grade chemicals, exceedingly accurate detection of impurities is required, lest the resulting component materials be impure and thereby unreliable.

According to Perkin-Elmer, its ELAN ICP-MS technology originated in 1983 at the University of Toronto with Dr. D. Douglas and Prof. J. B. French, working under contract to the Sciex Division of MDS Health Group. Sciex continued development and sales until 1986, when a joint venture was formed between Sciex and the Perkin-Elmer Corporation. Perkin-Elmer describes that Sciex develops and manufactures the ICP-MS at the Sciex facility in Toronto, and Perkin-Elmer provides a worldwide sales and service network.

Figure 1A:
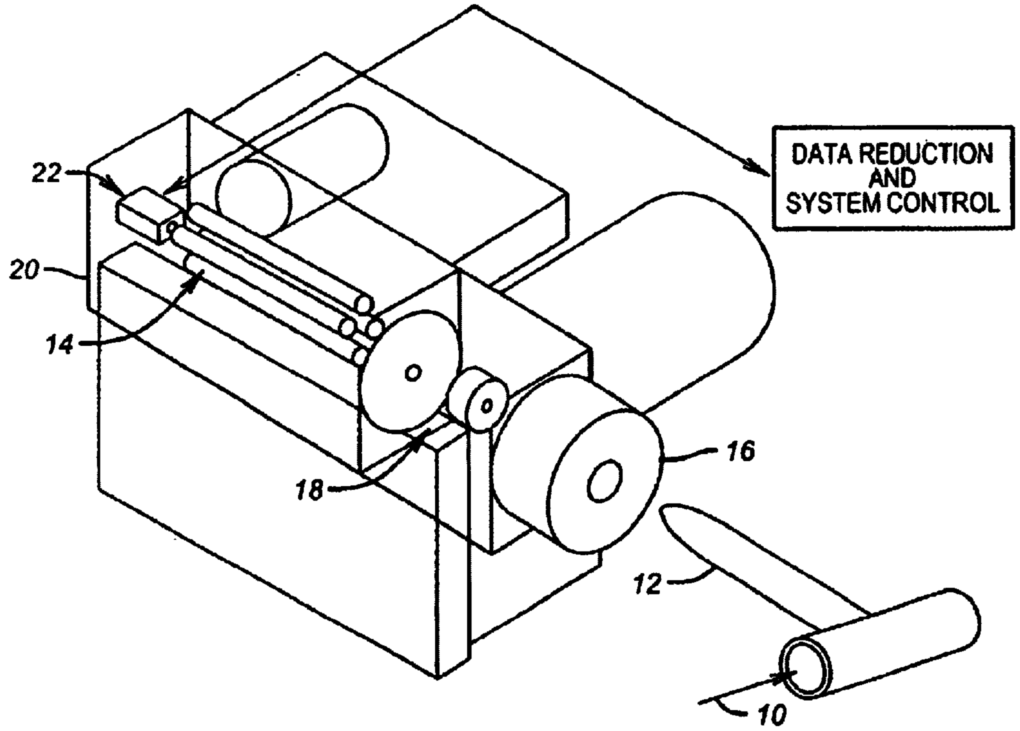
FIG. 1(*a*) is a schematic view of an ICP-MS illustrating the general features of an ICP-MS.
Figure 1B:
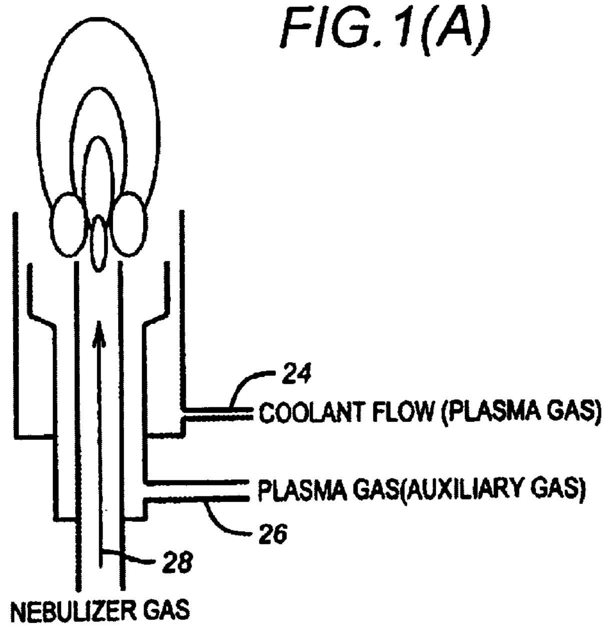

A schematic of the ELAN 6000 is shown in FIG. 1. As shown in FIG. 1(*a*), a sample 10 is introduced into the plasma for destruction of the sample matrix and ionization. Ions pass from the torch region 12, at atmospheric pressure, to the quadrupole mass spectrometer 14, at vacuum pressures, through the interface region 16 consisting of skimmer and sampling cones. The ion lens system 18 focuses the ions into the spectrometer 20, which separates the ions by mass-to-charge ratio and directs them to the detector 22 where they are measured.

FIG. 1(*b*) shows a schematic of the ICP torch 30, illustrating the positioning of differing gas flows. Thus, the introduction of coolant flow 24 (plasma gas) concentrically around the plasma gas 26 (auxiliary gas) is shown. The nebulizer gas 28 is directed centrally through the torch 30.

Metals complexes, alkoxides, and halides of transition metals such as Zr (Zirconium), Hf (Hafnium), Ta (Tantalum), Si (Silicon), Ti (Titanium), Cu (Copper) and Sb (Antimony) are being investigated for use as either high or low conductivity materials for the electronics industry. As such, the purity of these high conductivity materials is quite important. Typically these materials are decomposed in acids, bases or organic solvents and are subsequently analyzed by inductively coupled plasma mass spectrometry (ICP-MS) in order to obtain the concentration of trace elemental impurities.

Figure 2:
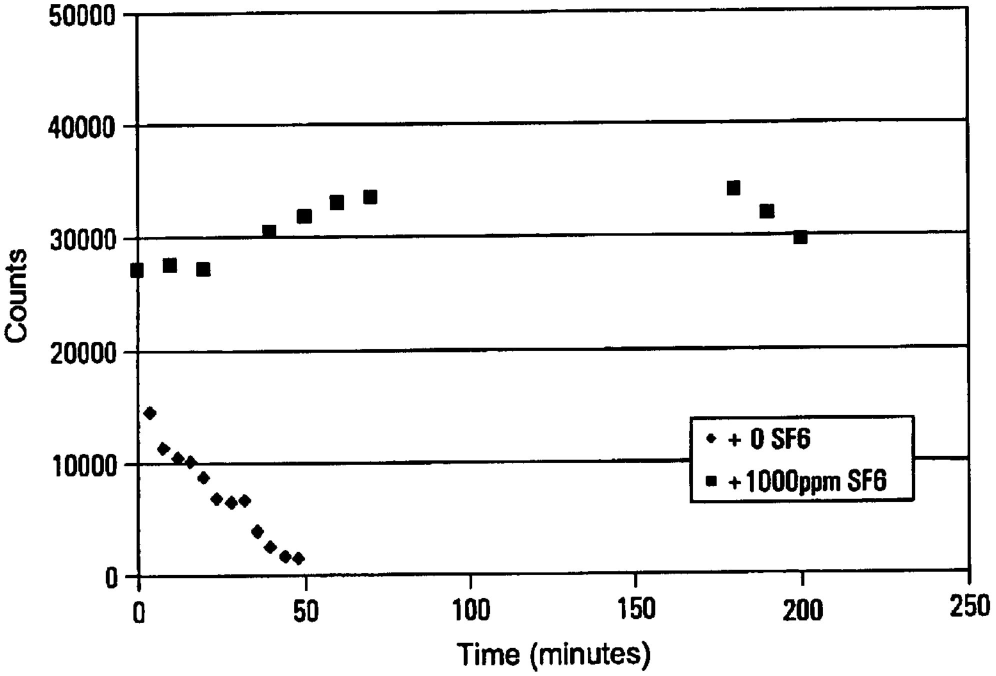
FIG. 2 is a graphical representation illustrating the effect of $SF_6$ addition to the Stability of 10 ppb Sodium Signal in 1000 ppm HF.

However, owing to the high matrix concentration of the transition metal, deposition on the sampling orifices ultimately occurs which severely alters the analytical sensitivity and achievable detection limits of impurities present in these compounds. The degradation of performance can occur in as little as 10 minutes (FIG. 2). Although dilution of the decomposed material is a viable alternative to decreasing the deposition on the sampling orifices, the requisite detection limits can not be obtained.

The key to increasing the available analysis time is to prevent (or decrease) the deposition from occurring. Sulfur hexafluoride ($SF_6$) was successfully added to the nebulizer gas stream (FIG. 1(*b*)) in order to decrease this deposition. $SF_6$ is ionized in the plasma to provide free fluoride ions that increase the volatility of the transition metal and prevent this deposition. Although other fluoride gases are available, such as $CF_4$ and $C_2F_6$, $SF_6$ is preferable owing to its lack of carbon that has also been shown to deposit on the sampling orifices.

Corrosive gases including but not limited to HF and $Cl_2$ could also be used less preferably however, as corrosion in the handling system of the ICP-MS could result. The concentration of $SF_6$ must be kept to a minimum in order to decrease etching of the orifice cones (platinum) by the free fluoride. Since it is desired to minimize the concentration of $SF_6$ in the plasma, the preferred gas stream for addition is the nebulizer gas stream which typically operates at a flow of approximately 1 L/min. Both the plasma and auxiliary gas flows utilize flows in excess of 1 L/min and would therefore subject the metallic components of the plasma interface and cones, as well as the quartz torch, to a higher concentration of reactive fluoride than necessary.

The effectiveness of the $SF_6$ addition can be monitored in either of two ways: by visual observation of the cones or by monitoring the signal intensity as a function of time of a lighter molecular weight element, such as sodium. FIG. 2 illustrates the decrease in measured signal intensity of 10 ppb sodium in 1000 ppm hafnium. The decrease in signal intensity is observed almost immediately, with total signal loss after approximately 50 minutes. The addition of 1000 ppm $SF_6$ into the nebulizer gas stream is observed to prevent signal decay or loss.

Referring now to the data observed, the following can be discerned. As shown in FIG. 2, $SF_6$ addition affects the stability of a 10 ppb Sodium Signal in 1000 ppm HF. Note that the flatter the curve shown by the data, the more stable the readings and the more accurate the equipment remains over time. Thus, without the $SF_6$ addition, the signal fades rapidly, and the data shows nearly zero counts by the time 50 minutes have elapsed.

As shown in FIG. 1(*a*), a schematic view of a conventional ICP-MS 20 includes an illustration of the sample introduction orifice 10 and the torch 30 (more clearly shown in FIG. 1(*b*)). The general layout of the interface 16 leading past the lens system 18 and through the quadrupole 14 is shown, leading in flow-wise relation to the detector 22.

As more clearly shown in FIG. 1(*b*), a schematic cross-sectional view of an ICP-MS torch 30 illustrates the relative positioning of the different gas flows. Note that the chemical gas used according to the preferred embodiment can be used to prevent the deposition of transition metals on the sampling orifices of an ICP-MS, or can be used to prevent the deposition of semi-metals or nonmetals on the sampling orifices of an ICP-MS. $SF_6$ can be introduced into the nebulizer flow 28 of the torch 30 and/or into either the auxiliary 26 or plasma 24 gas streams.

Figure 3:
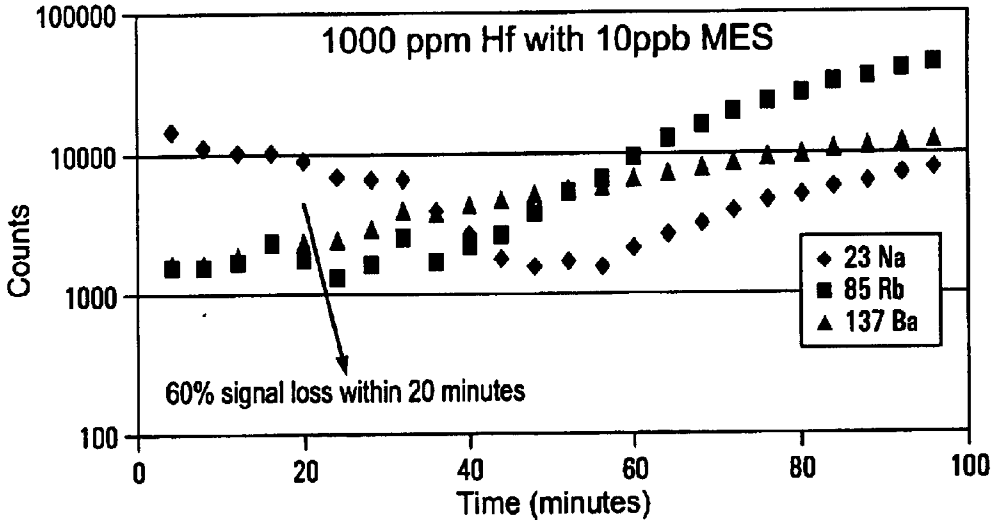
FIG. 3 is a graphical representation illustrating signal deterioration as a function of time in the presence of either sodium, rubidium or barium.

FIG. 3 shows a graphical representation illustrating signal deterioration as a function of time in the presence of either sodium, rubidium or barium. Thus, data is presented comparing the use of 1000 ppm Hf with 10 ppb MES (multi-element solution).

The multi-element solution typically comprises standard reference materials and its composition is chosen to reflect elements of interest. In this case, the multi-element solution contains 10 ppb of all of the following elements: Au, Hf, Ir, Pd, Rh, Ru, Sb, Sn, Te, Ag, Al, As, Ba, Be, Bi, Ca, Cd, Co, Cr, Cs, Cu, Fe, Ga, In, K, Li, Mg, Mn, Na, Ni, Pb, Se, Sr, Ti, U, V, Zn, Th, B, Mo, Nb, P, Re, S, Si, Ta, Ti, W and Zr. The multielement solutions (MES) are commercially available, off the shelf products. Typically, these are purchased at concentrations of 1000 ppm. They are subsequently diluted in the acid of interest. In the present application, the acid used for dilution is 0.1% HF. This solution is then spiked into the matrix of interest (for example 1000 ppm HF). To keep the Hf in solution at this concentration, HF must be present to stabilize it.

Note the representation is logarithmic, showing a 60 percent signal loss within twenty minutes. Data comparisons for readings for Na, Rb and Ba are shown.

Figure 4:
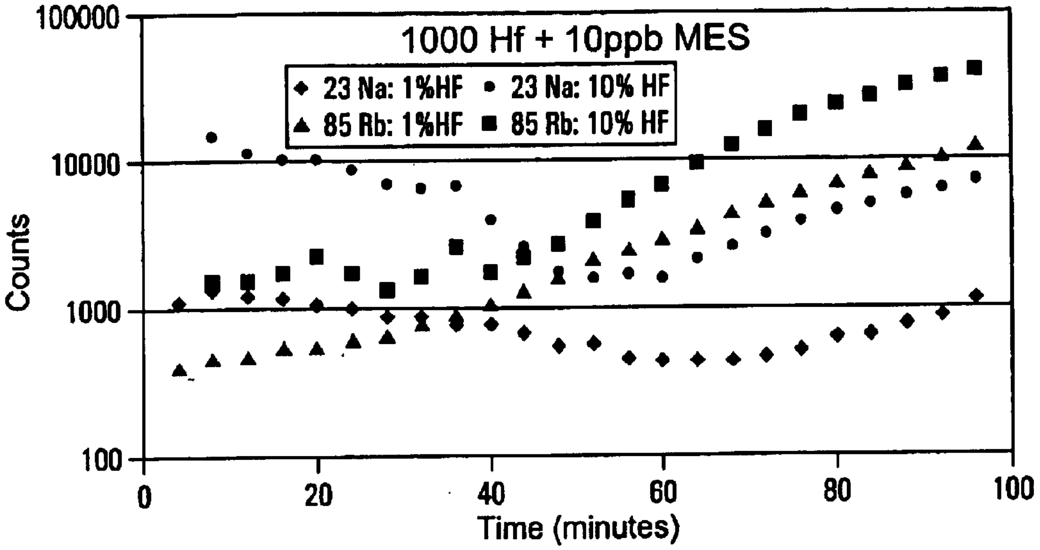
FIG. 4 is a graphical representation illustrating the effect of increased HF concentration on the deposition or stability.

FIG. 4 is a graphical representation illustrating the effect of increased HF concentration on the deposition or stability. Here, it can be discerned that no appreciable improvement occurs on deposition or stability as a result of a ten-fold increase in the concentration of HF. Data showing the stability of readings for Na and Rb using 1% and 10% concentrations of HF are shown, indicating generally parallel data behavior.

Figure 5:
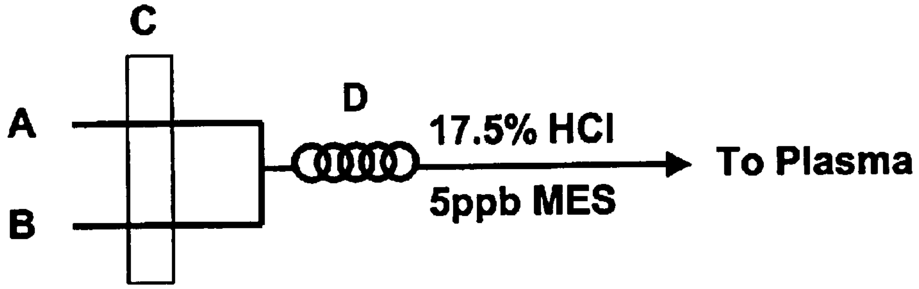
FIG. 5 is a schematic representation illustrating a peristaltic pump subassembly.

FIG. 5 is a schematic representation illustrating a peristaltic pump subassembly.

Figure 6:
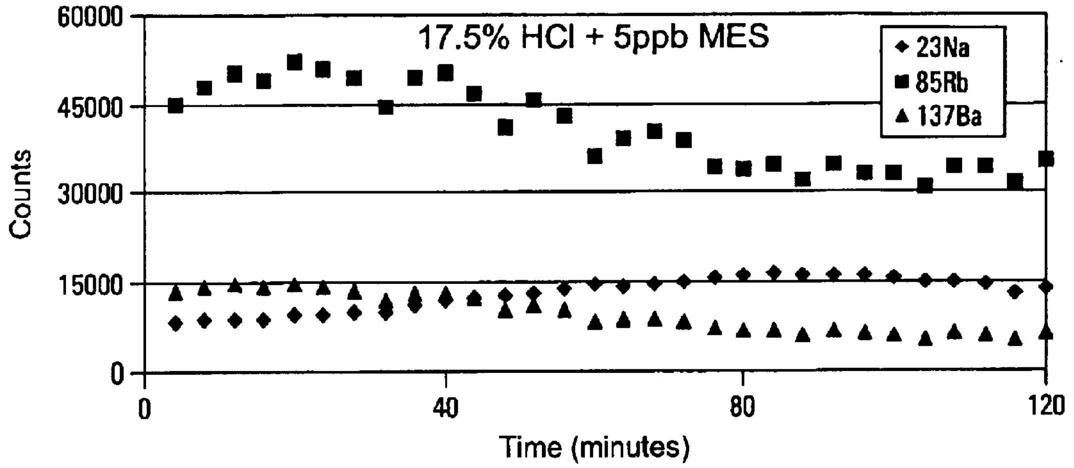
FIG. 6 is a graphical representation illustrating the effect of acid type on stability.

FIG. 6 is a graphical representation illustrating the effect of acid type on stability. Note that while the data shows improved stability and decreased deposition, the acid concentration into the plasma is too high, and severe corrosion may occur as a result, as well as interferences which can prohibit the low level determination of certain critical elements. Again, data is presented for Na, Rb and Ba.

Figure 7:
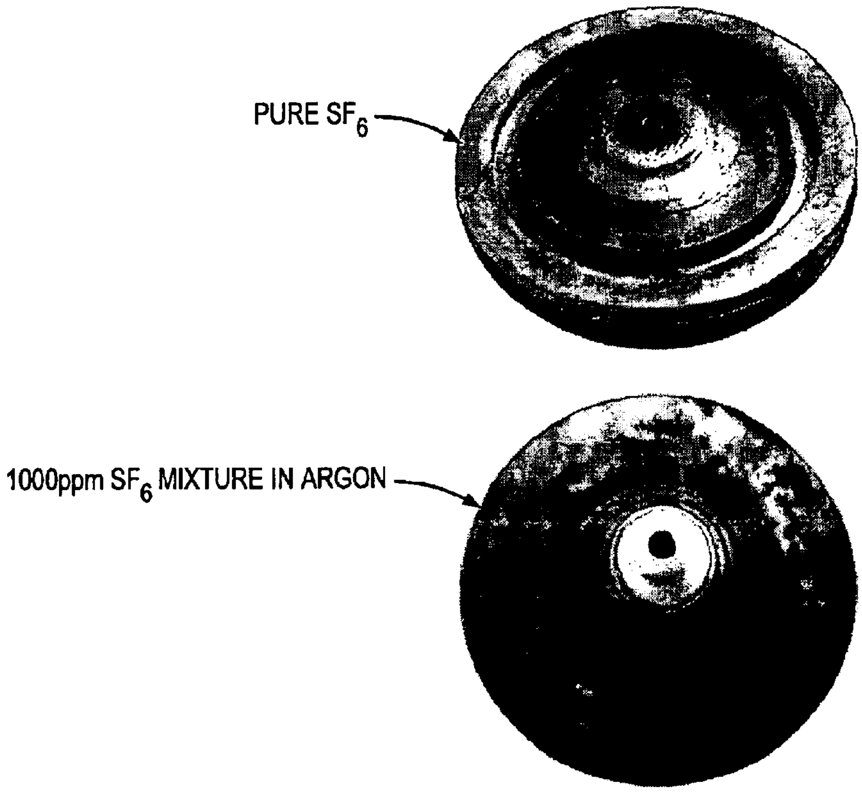
FIG. 7 is an illustration comparing pure $SF_6$ against a dilute $SF_6$ mixture in Argon as a nebulizer gas.

FIG. 7 is an illustration comparing pure $SF_6$ against a dilute $SF_6$ mixture in Argon as a nebulizer gas. Thus, the corrosive effects of $SF_6$ use are readily apparent. The corrosion after thirty minutes in the presence of pure $SF_6$ is extensive. In contrast, no observed deposition has occurred and virtually no corrosive effect has occurred after four hours in the presence of a 1000 ppm $SF_6$ mixture in Argon.

Figure 8:
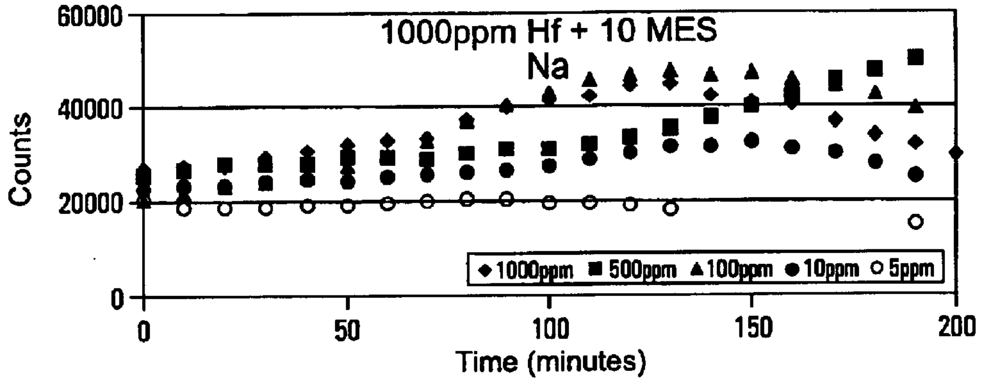
FIG. 8 is a graphical representation illustrating the effect of $SF_6$ concentration in a first carrier stream on stability.

FIG. 8 is a graphical representation illustrating the effect of $SF_6$ concentration in a first carrier stream on stability. Here, data for Na is shown as a function of time, and the concentration of the Hf mixture is varied at 5 ppm, 10 ppm, 100 ppm, 500 ppm and 1000 ppm.

Figure 9:
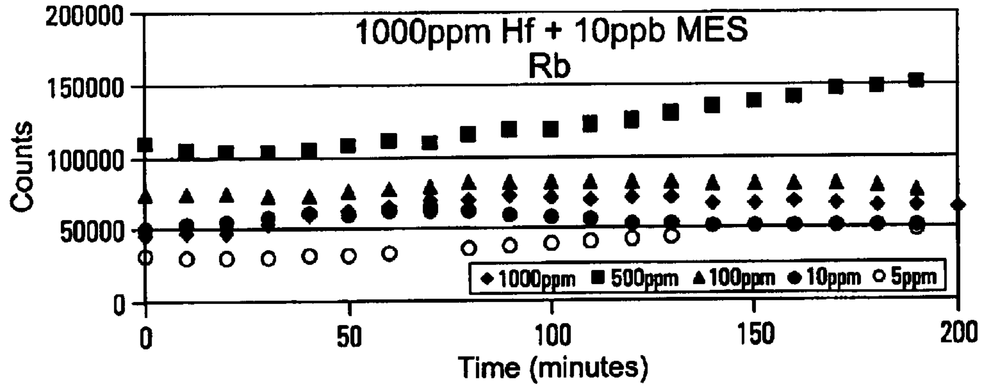
FIG. 9 is a graphical representation illustrating the effect of $SF_6$ concentration in a second carrier stream on stability.

FIG. 9 is a graphical representation illustrating the effect of $SF_6$ concentration in a first carrier stream on stability. Here, data for Rb is shown as a function of time, and the concentration of the Hf mixture is varied at 5 ppm, 10 ppm, 100 ppm, 500 ppm and 1000 ppm.

Figure 10:
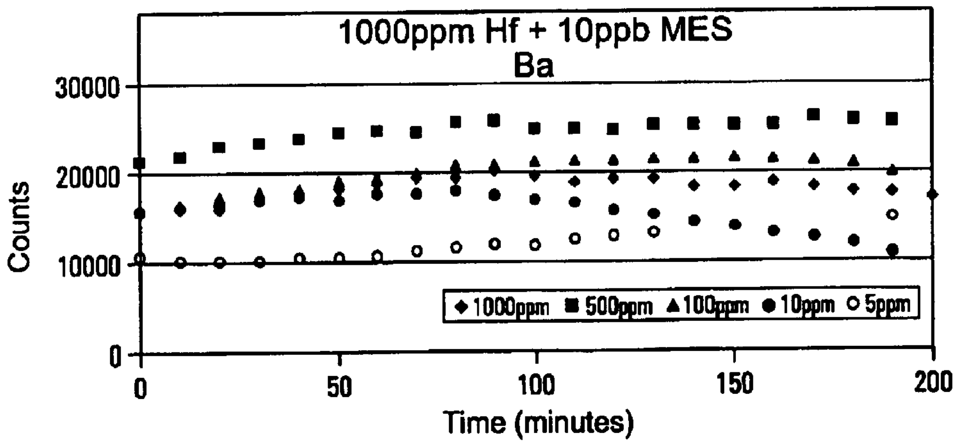
FIG. 10 is a graphical representation illustrating the effect of $SF_6$ concentration in a third carrier stream on stability.

FIG. 10 is a graphical representation illustrating the effect of $SF_6$ concentration in a first carrier stream on stability. Here, data for Ba is shown as a function of time, and the concentration of the Hf mixture is varied at 5 ppm, 10 ppm, 100 ppm, 500 ppm and 1000 ppm.

Figure 11:
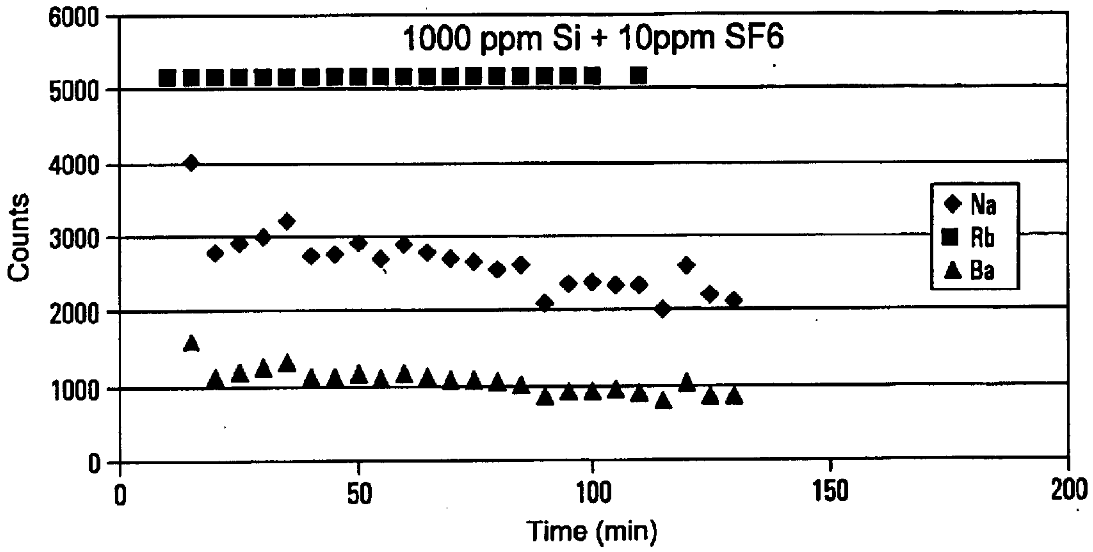
FIG. 11 is a graphical representation illustrating the stability of 10 ppb Na, Rb and Ba in a 1000 ppm Si matrix using 10 ppm $SF_6$ in the nebulizer gas stream.

FIG. 11 is a graphical representation illustrating the effect of a 1000 ppm silicon and 10 ppm $SF_6$ mixture on data stability. Here, data is presented for Na, Rb and Ba, and illustrates excellent data stability over two hours.

Figure 12:
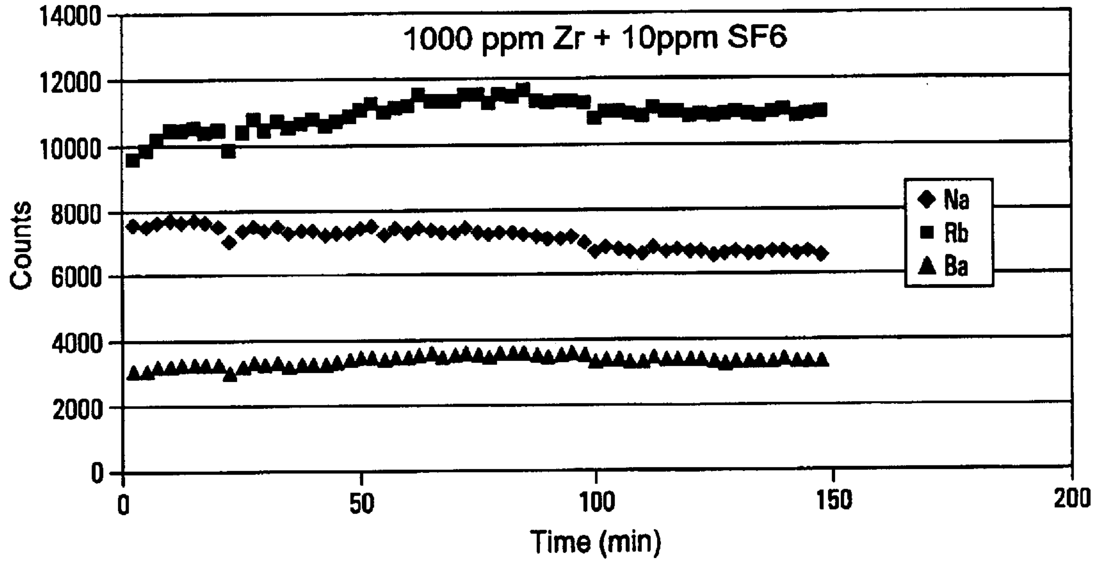
FIG. 12 is a graphical representation illustrating the stability of 10 ppb Na, Rb and Ba in a 1000 ppm Zr matrix using 10 ppm $SF_6$ in the nebulizer gas stream.

Finally, in FIG. 12, a graphical representation illustrating the effect of a 1000 ppm zirconium and 10 ppm $SF_6$ mixture on data stability. Here, data is presented for Na, Rb and Ba, and again illustrates excellent data stability over two hours.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method of reducing sample deposition on the sampling orifices of an inductively coupled plasma mass spectrometer having a nebulizer, the method comprising:

providing an inductively coupled plasma mass spectrometer having a nebulizer; and introducing a nebulizer add-gas into the nebulizer, the add-gas comprising $SF_6$.

2. The method described in claim 1, wherein the $SF_6$ concentration in the add-gas is between about 5 ppm and about 1000 ppm.

3. The method described in claim 2, wherein the $SF_6$ concentration in the add-gas is between about 5 ppm and about 500 ppm.

4. The method described in claim 1, wherein the $SF_6$ concentration in the add-gas is between about 5 ppm and about 10 ppm.

5. The method described in claim 1, wherein the $SF_6$ concentration in the add-gas is between about 10 ppm and about 1000 ppm.

6. The method described in claim 5, wherein the $SF_6$ concentration in the add-gas is between about 10 ppm and about 500 ppm.

7. The method described in claim 6, wherein the $SF_6$ concentration in the add-gas is between about 10 ppm and about 100 ppm.

* * * * *